United States Patent [19]

Tsen et al.

[11] Patent Number: 4,466,985

[45] Date of Patent: Aug. 21, 1984

[54] METHOD FOR PREPARING CANNED, RETORTED PASTA PRODUCTS

[75] Inventors: Cho C. Tsen, Manhattan, Kans.; Karl B. Adams, Redlands, Calif.

[73] Assignee: Kansas State University Research Foundation, Manhattan, Kans.

[21] Appl. No.: 361,894

[22] Filed: Mar. 25, 1982

[51] Int. Cl.³ .......................... A21D 2/00; A23L 1/16
[52] U.S. Cl. .................... 426/131; 426/407; 426/557; 426/654
[58] Field of Search ............... 426/131, 557, 654, 407

[56] References Cited

U.S. PATENT DOCUMENTS 4,000,330 12/1976 Sipos et al. .......................... 426/557

FOREIGN PATENT DOCUMENTS 519582 6/1976 U.S.S.R. .............................. 426/557

*Primary Examiner*—Raymond N. Jones
*Assistant Examiner*—Elizabeth A. Hatcher
*Attorney, Agent, or Firm*—Schmidt, Johnson, Hovey & Williams

[57] ABSTRACT

An improved process (and the resultant product) for the preparation of canned, retorted pastas is disclosed which yields firm, high quality pasta products not unduly effected by retorting conditions. The improved pasta products are superior to conventional pasta products and are admirably suited for use as ingredients in soups, whether in dry forms or in canned products. In the invention, a dough including respective quantities of a wheat-derived material, water, 11S soy protein or materials containing 11S soy protein such as soy flour, soy protein concentrate or isolate, and a surfactant taken from the group consisting of sodium or calcium salts of the acyl lactylates of $C_{14}$–$C_{22}$ fatty acids is prepared, and pasta of desired configuration (such as spaghetti) is formed therefrom. Such pasta is thereafter canned and subjected to the usual retorting conditions of elevated temperatures and pressures in order to cook the pasta. Alternately, use of 11S soy protein alone in pasta products and without addition of surfactant yields useful products. Comparative tests demonstrate that pasta produced in accordance with the invention are firmer and have lesser cooked weights, and consequently exhibit improved organoleptic properties such as texture and mouth feel.

10 Claims, No Drawings

METHOD FOR PREPARING CANNED, RETORTED PASTA PRODUCTS

BACKGROUND OF THE INVENTION

1. Field of the Invention

The present invention is concerned with a process and product wherein especially prepared pasta products may be canned and retorted without the usual severe loss of firmness and organoleptic properties associated with canned pastas. More particularly, it is concerned with such a process and product wherein the pasta includes respective quantities of 11S soy protein (as for example by addition of soy flour) and preferably a surfactant such as sodium stearoyl-2-lactylate. Retorting tests demonstrate that pasta processed in accordance with the present invention is superior in firmness as compared with conventional pastas.

2. Description of the Prior Art

Durum flour or semolina, soft and hard wheat flours or farinas mixed with water and extruded result in the multitude of products referred to as pasta. The simplicity of producing and storing these types of products has made pasta consumption more widespread in the world than bread. Because pasta products are generally dried below ten percent moisture they have an extremely long shelf life. This characteristic, along with high acceptability, makes pasta products ideal for nutritional enrichment and fortification.

Although the canning of different food items was originally intended to be strictly a method for food preservation, canning has also evolved as a form of convenience food. Many canned items need only be heated and served. A wide variety of canned pasta products fall into this category. However, the quality of such pasta products has generally been rather low. The high temperatures and long processing times involved in the retorting of canned pasta products has proven to be detrimental in that the products are excessively soft and moisture laden. Accordingly, canned pasta products have generally been considered a very poor substitute for pasta prepared in the traditional fashion.

It has been suggested in the past that surfactants be used in an attempt to increase the firmness of canned spaghetti. Current published data only describe the effects of monoglycerides on canned spaghetti (Winston, J. J., *The use of distilled monoglycerides in macaroni products,* The Macaroni J; 43(1):14 (1961)). In any event, it is believed that the use of monoglycerides in this context has not been significantly commercialized.

Soy protein products, primarily soy flour, soy protein concentrate, and soy protein isolate have found their way into a wide variety of food products, including pasta. In some products, these proteins are incorporated for desired functional purposes, while in other products, they are present only to improve the product from a nutritional standpoint. The use of soy proteins in certain contexts has resulted in adverse effects. This is particularly true of baked foods, where addition of soy proteins has been found to decrease loaf volume and crumb score. Although the use of soy flour or soy protein in pastas is attractive from a nutritional standpoint, the use of these materials as an additive to pastas has not become a widespread practice.

SUMMARY OF THE INVENTION

The present invention in one aspect is directed to a process for preparing a canned, retorted pasta product which comprises the steps of preparing the product by admixing a wheat-derived material such as flour, semolina or farina along with water, an amount of 11S soy protein, or materials containing 11S soy flour protein concentrate or isolate and a surfactant taken from the group consisting of sodium or calcium salts of the acyl lactylates of $C_{14}$-$C_{22}$ fatty acids to yield a dough. The pasta product is then formed from the dough into a desired shape, dried, and is canned and retorted at elevated temperatures and pressures.

Preferably, the surfactant employed is sodium or calcium stearoyl-2-lactylate, with the sodium salt being the most preferred.

Alternately, an otherwise conventional pasta formulation can be advantageously supplemented through use of an agent which consists essentially of 11S soy protein.

Comparative tests demonstrate that pasta prepared in accordance with the present invention is significantly more resistant to undue water absorption and softening during retorting at a given pH, so that the resultant canned pasta products have enhanced organoleptic properties.

DESCRIPTION OF THE PREFERRED EMBODIMENTS

In one preferred process in accordance with the invention, a desired pasta product is prepared by first admixing one or more wheat-derived materials and water, but with the inclusion of respective amounts of 11S soy protein and a surfactant. The wheat-derived material may be any one of those conventionally employed, such as flour, semolina, or farina. Water is variable, but is typically present in an amount of from about 20 to 35% by weight, more preferably 21 to 27.5% by weight.

The 11S soy protein may be added as a separated fraction, or simply as a part of a material such as soy flour. In terms of 11S soy protein per se, the level of usage should be from about 2.0 to 15.5% by weight, and more preferably from about 2.0 to 8.0% by weight. On the other hand, when the 11S protein is added as a part of soy flour, the soy flour should be present at a level of from about 5.0 to 20% by weight, and more preferably from about 5.0 to 10.0% by weight.

The surfactant should be taken from the group consisting of sodium or calcium salts of the acyl lactylates of $C_{14}$-$C_{22}$ fatty acids, and the most preferred surfactant is sodium stearoyl-2-lactylate. The surfactant should be present at a level of from about 0.2 to 2.0% by weight, and more preferably from about 0.5 to 1% by weight when used in connection with an 11S containing substance.

The above-described ingredients are mixed as a dough and a desired pasta product is formed from the dough by conventional techniques such as extrusion. Generally speaking, the next step involves drying of the formed dough to yield the finished, storable pasta products.

The next step of the process of the invention involves canning of the pasta product by placing the same in a container along with a liquid such as water or a sauce, and sealing the container. At this point the canned pasta is cooked by a retorting process. This generally involves subjecting the canned pasta to temperatures of at least about 110° C. and pressures of at least 10 psi for a period of at least 10 minutes. In some cases, the conditions of retorting will be considerably more severe than this, however.

In alternative procedures, the above outlined method is followed except that the surfactant is omitted and use is made of a treating agent which consists essentially of 11S protein, the latter preferably being present at a level of from about 2 to 15.5% by weight, and more preferably from about 3 to 10% by weight.

As noted above, it has been found that pasta products of the invention have enhanced resistance to retorting conditions, which improves the quality of the canned product. 11S soy globulin is also referred to as glycinin and has a molecular weight of approximately 320,000. It contains little if any alpha helix with some antiparallel beta-structures. The 11S protein has been shown to exist as a single protein species, with a complex quaternary structure. Four acid and four basic sub-units are present in equimolar amounts.

The most notable characteristic of 11S soy protein is the ability to undergo a cryogenic precipitation, i.e., at 2°-3° C. the protein forms aggregate and precipitates. This type of precipitation is commonly used in the isolation of crude 11S fractions containing over 80% 11S protein.

The functional characteristics of 11S protein in food systems have been investigated heretofore, particularly in connection with tofu gels. The 11S molecules produced gels that were more firm than comparative gels made using 7S soy protein, as indicated by high texturometer readings and higher breaking stress values. Whether the gels were formed by heat coagulation, calcium precipitation, or acid precipitation, the 11S protein produced gels that were firmer than the 7S protein gels.

Work has also been done in an attempt to determine the existence and nature of interactions between soy and wheat proteins in food systems. However, the existence of any such interactions has not been conclusively proven. Accordingly, the precise mechanism by which the soy protein-surfactant combination of the present invention effects improvement in canned pasta products is not understood.

The following Examples will set forth illustrative methods and products in accordance with the present invention. However, nothing in the Examples should be taken as a limitation upon the overall scope of the invention.

EXAMPLE

A series of tests was conducted to demonstrate the effectiveness of using soy protein and SSL (sodium stearoyl-2-lactylate) in spaghetti to increase and firmness and decrease the cooked (retorted) weight thereof.

In each test, spaghetti samples were made using No. 1 durum semolina wheat flour obtained from the North Dakota State Mill, and SSL from the C. J. Patterson Company of Kansas City, Mo. Defatted soy flour used was obtained from the Central Soya Company (Soyfluff 200 TM), as was the soy protein isolate (Promine D TM).

All spaghetti doughs were prepared as follows. The SSL surfactant was dispersed in water at 55° C., and this was slowly added to the bowl of a Hobart mixer which contained premixed (five minutes) durum wheat flour and soy flour (where used). The samples were then mixed an additional two minutes at medium speed.

The resultant doughs were then introduced into the mixing chamber of a DeMaco Laboratory Extruder and allowed to mix 30 seconds to allow an even distribution in the chamber.

The extruder's auger speed was 25 rpm and a vacuum of 20 psi was maintained throughout the extrusion period. The mixing chamber as well as the extrusion barrel were heated to 40° C. by water circulating around these areas in specially fitted jackets. The diameter of the brass spaghetti die was 1.9 mm. Samples were prepared in duplicate.

Samples were dried in a laboratory dryer designed and built at Kansas State University. The drying process involved three different stages. First, a preliminary drying period of 6 hours with a dry bulb reading of 85°-88° F. and a wet bulb reading of 81°-84° F. (a four degree difference between the dry and wet bulb was maintained). This was followed by a primary drying period at 108°-110° F. dry bulb vs. 101°-103° F. wet bulb for 8 hours (a 7 degree difference between the dry and wet bulb was desired). A final 8 hour period with the dry and wet bulbs set at 108°-110° F. and 97°-99° F. respectively completed the drying process (an eleven degree difference was desired). Samples were stored at room temperature under light limiting conditions prior to canning.

Forty grams of the dried spaghetti with an average strand length of approximately 10 cm. were placed in No. 303 cans. The cans were then filled with distilled water. The cans were sealed and processed for varying times. Retort conditions were 122±2° C. and 15 psi for the processing times. At the end of the processing period the retort was filled with cold water through an internal outlet, thus allowing the cans to be cooled quickly.

The canned samples were allowed to set 48 hours prior to evaluation. The cans were then opened, drained, and the contents weighed to determine final cooked weight. Spaghetti cooked weight was determined by AACC (American Association of Cereal Chemists) Approved Method 16-50 (approved April 1961).

Firmness was measured on an amplified strain gauge designed at Kansas State University. A plexiglass knife similar to that of Walsh and Giles (Walsh, D. E. and Giles, K. A., *The influence of protein composition on spaghetti quality*, Cereal Chem 48:544-554 (1971) was passed through individual strands of spaghetti and the gram-force required to cut the strand in half was registered on a recorder. Five strands of each sample were measured and averaged to achieve the final firmness value for a particular sample. All samples were tested in triplicate.

Analysis of variance was the statistical method used for all samples. The Least Squares Difference (LSD) Multiple Range Test was used for determining significant differences between the experimental samples and the control. Alpha was set at 0.01.

The following Table I sets forth the results of the tests described above. All data reported with respect to runs in accordance with the invention are statistically significant.

TABLE I

| | Protein Additive % | Surfactant % | Water Added (ml) | FIRMNESS (g) Total Processing Time (min.) | | | COOKED WEIGHT (g)[1] Total Processing Time (min.) | | | % Protein |
|---|---|---|---|---|---|---|---|---|---|---|
| | | | | 15 | 22.5 | 37.5 | 15 | 22.5 | 37.5 | |
| Sample Control | — | — | | 30.9 | 19.6 | 13.8 | 222.5 | 253.2 | 291.6 | 16.7 |
| (1) Soy Flour + SSL | 10 | 0.25 | 565 | 37.6 | 30.2 | 18.7 | 199.9 | 223.4 | 252.5 | 20.1 |
| (2) Soy Flour + SSL | 10 | 0.5 | 610 | 46.3 | 36.0 | 19.4 | 184.6 | 206.7 | 251.4 | 20.1 |
| (3) Soy Flour + SSL | 10 | 1.0 | 650 | 50.8 | 36.8 | 20.0 | 185.1 | 207.1 | 252.7 | 20.1 |
| (4) Soy Flour + SSL | 5 | 0.5 | 610 | 45.0 | 30.7 | 18.6 | 194.7 | 221.0 | 269.3 | 18.4 |
| (5) Soy Flour + SSL | 15 | 0.5 | 610 | 44.6 | 33.1 | 19.2 | 176.6 | 199.0 | 234.9 | 20.5 |
| (6) Soy Protein Isolate + SSL | 10[2] | 0.5 | 660 | 40.8 | 28.0 | 19.2 | 211.2 | 238.9 | 274.3 | 20.1 |

[1] All values at the listed processing times are significantly less than the control samples.
[2] Protein added to equal that of a soy flour sample.

The higher firmness and lower cooked weight readings indicate that the addition of soy flour (which contains 11S soy protein) along with the lactylate significantly improve the ability of the spaghetti to withstand retorting conditions. Softening of spaghetti during retorting is believed to be a direct result of solvent ($H_2O$) penetration of the spaghetti, which brings about hydration as well as gelatinization of the starch fraction and denaturization of proteins.

Under the identical processing and testing conditions previously described, a sample with 5% 11S soy protein was found to be much firmer and to have a lower cooked weight than the control sample, as shown in Table II. This demonstrates that 11S soy protein alone (without the added lactylate) can also improve the ability of the spaghetti to withstand retorting conditions.

TABLE II

| | Protein additive % | Firmness (g) Total Processing Time (min) | | | Cooked Weight Total Processing Time (min) | | |
|---|---|---|---|---|---|---|---|
| | | 15 | 22.9 | 37.5 | 15 | 22.5 | 37.5 |
| Sample Control | — | 36.6 | 29.9 | 16.3 | 193.8 | 214.6 | 272.4 |
| 11S Soy Protein | 5 | 46.5 | 38.2 | 22.3 | 182.6 | 205.4 | 263.2 |

In a related series of tests, spaghetti made in accordance with Runs Nos. 2 and 3 of Table I were canned and retorted with a commercial tomato sauce (Chef Boy-ar-dee, Chicago, Ill.) diluted 1:1 (v/v) with distilled water. The sauce had a pH of 4.2. The samples were retorted at 122±2° C. and 15 psi for 65 minutes, and the products were thereafter evaluated as described above. The results of these tests are set forth in Table III:

TABLE III

| Sample Description | Firmness | Cooked Weight (g) |
|---|---|---|
| Control | 17.6 | 178.3 |
| Soy Flour 10% + SSL 0.5% | 21.7 | 179.2 |
| Soy Flour 10% + SSL 1.0% | 21.6 | 177.0 |

The use of tomato sauce with a limited amount of water, resulted in lower cooked weights and higher firmness scores for those samples containing the surfactant (SSL) and the soy flour (which contains 11S soy protein). The relatively low pH of the sauce may account for this, inasmuch as wheat proteins are more soluble at this pH. Thus, the sauce could have had a solubilizing effect which in turn softened and weakened the protein matrix of the final product.

Having thus described the invention, what is claimed as new and desired to be secured by Letters Patent is:

1. A process for preparing a canned, retorted pasta product, comprising the steps of:
   preparing said pasta product by admixing a wheat-derived material, water, from about 2 to 15.5% by weight of glycinin, and from about 0.2 to 2% by weight of surfactant taken from the group consisting of sodium and calcium stearoyl-2-lactylate to yield a dough, and forming said dough into a desired shape;
   canning said pasta product; and
   retorting said canned pasta product at elevated temperatures and pressures for a sufficient period of time for cooking the product.

2. The process as set forth in claim 1, wherein said surfactant is present at a level of from about 0.5 to 1.0% by weight.

3. The process as set forth in claim 1, wherein said glycinin is present at a level of from about 2.0 to 8.0% by weight.

4. The process as set forth in claim 1, said glycinin being a part of soy flour, said soy flour being present in said admixture at a level of from about 5.0 to 20% by weight.

5. The process as set forth in claim 4, wherein said level is from about 5.0 to 10.0% by weight.

6. The process as set forth in claim 1, including the step of drying said formed dough.

7. The process as set forth in claim 1, said canning step comprising placing said product into a container along with a liquid, and sealing said container.

8. The process as set forth in claim 1, said retorting including the steps of subjecting said canned pasta to temperatures of at least about 110° C. and pressures of at least about 10 psi for a period of at least about 10 minutes.

9. A process for preparing a canned, retorted pasta product, comprising the steps of:
   preparing said pasta product by admixing a wheat-derived material, water, and a soy protein agent consisting of from about 2 to 15.5% by weight of glycinin for improving the retort resistance of the pasta product, into a dough of desired shape, said pasta product being free of soy protein except for said glycinin;

canning said pasta product; and retorting said canned pasta product at elevated temperatures and pressures for a sufficient period of time for cooking the product.

10. A canned, retorted pasta product made by the method of claim 1.

* * * * *